US007243886B2

(12) United States Patent
Bayer et al.

(10) Patent No.: US 7,243,886 B2

(45) Date of Patent: Jul. 17, 2007

(54) ARRANGEMENTS, BRACES, AND METHODS FOR SUPPORTING AN ARM OF AN ORNAMENTAL FIXTURE

(75) Inventors: George Bayer, Plattsburgh, NY (US); Andrew J. Schonbek, Plattsburgh, NY (US); Daniel Tucker, Chazy, NY (US)

(73) Assignee: Schonbek Worldwide Lighitng Inc., Plattsburgh, NY (US)

( * ) Notice: Subject to any disclaimer, the term of this patent is extended or adjusted under 35 U.S.C. 154(b) by 231 days.

(21) Appl. No.: 10/773,551

(22) Filed: Feb. 5, 2004

(65) Prior Publication Data

US 2005/0173607 A1 Aug. 11, 2005

(51) Int. Cl.
*F16M 11/00* (2006.01)

(52) U.S. Cl. .................. 248/200; 248/220.21; 362/405

(58) Field of Classification Search ................ 248/121, 248/126, 123.11, 903, 447.1, 27.8, 200, 220.21; D26/99; 362/405, 406, 442, 806, 404, 401, 362/405 X, 277, 451, 416, 417, 432, 392, 362/391

See application file for complete search history.

(56) References Cited

U.S. PATENT DOCUMENTS

| | | | | |
|---|---|---|---|---|
| 1,494,208 | A | 5/1924 | Bailey | |
| 1,531,266 | A * | 3/1925 | Russell | 40/617 |
| 1,534,662 | A * | 4/1925 | Riddle | 362/405 |
| 1,655,102 | A * | 1/1928 | Kay | 362/406 |
| 1,971,705 | A | 8/1934 | Cole | 240/73 |
| 2,023,541 | A | 12/1935 | Paull | 248/279 |
| 2,139,649 | A * | 12/1938 | Aanerud | 403/283 |
| 2,750,142 | A | 6/1956 | McKee | 248/216 |
| 3,354,305 | A * | 11/1967 | Spicer et al. | 362/406 |
| 3,629,571 | A | 12/1971 | Schonbek | 240/153 |
| 5,104,082 | A | 4/1992 | Bayer | 248/303 |

(Continued)

FOREIGN PATENT DOCUMENTS

| | | | |
|---|---|---|---|
| DE | 674472 | 4/1939 | 21/58 |

(Continued)

OTHER PUBLICATIONS

Notification Concerning Transmittal of Copy of International Preliminary Report on Patentability (Chapter I of the Patent Cooperation Treaty) (PCT Rule 44bis,1(c)) (Form PCT/IB/326), and International Preliminary Report on Patentability (Form PCT/IB/373) of corresponding International Application No. PCT/US2005/003428, filed Jan. 28, 2005, dated Aug. 17, 2006.

*Primary Examiner*—Gwendolyn Baxter

(74) *Attorney, Agent, or Firm*—Heslin Rothenburg Farley & Mesitti PC; John Pietrangelo

(57) ABSTRACT

Arrangements, braces, and methods for supporting an arm of an ornamental fixture, for example, chandeliers, are provided. The arrangements and braces include elongated elements having first ends adapted to be mounted to a support, a second free end, and a platform located between the first end and the second end for supporting the arm of the fixture. Aspects of the invention may be used to support fragile arms of chandeliers, for example, glass arms. Aspects of the invention allow for the use of longer arms, for example, for use in chandeliers over 10 feet in diameter, or for arms having higher loadings, for example, having heavier or more numerous ornaments and light fixtures.

15 Claims, 7 Drawing Sheets

U.S. PATENT DOCUMENTS

| | | | | |
|---|---|---|---|---|
| 5,109,325 | A | 4/1992 | Bayer et al. | 362/433 |
| 5,116,009 | A | 5/1992 | Bayer | 248/303 |
| 5,144,541 | A | 9/1992 | Schonbek | 362/405 |
| 5,241,460 | A | 8/1993 | Schonbek | 362/405 |
| 5,258,898 | A | 11/1993 | Thornton | 362/394 |
| 5,285,364 | A | 2/1994 | Bayer | 362/405 |
| 5,573,330 | A | 11/1996 | Lucas | 362/405 |
| 5,577,838 | A | 11/1996 | Lucas | 362/405 |
| 5,621,927 | A * | 4/1997 | Reiss et al. | 4/559 |
| 5,667,188 | A | 9/1997 | Bettinsoli | 248/558 |
| D397,494 | S | 8/1998 | Bayer et al. | D26/154 |
| 5,906,430 | A | 5/1999 | Bayer | 362/404 |
| 5,921,668 | A | 7/1999 | Bayer | 362/404 |

FOREIGN PATENT DOCUMENTS

EP 0 335 843 A2 4/1989

* cited by examiner

ARRANGEMENTS, BRACES, AND METHODS FOR SUPPORTING AN ARM OF AN ORNAMENTAL FIXTURE

CROSS REFERENCE TO RELATED APPLICATIONS

This application is related to the following application which is commonly-assigned and filed at the same time as this application:

Utility patent application entitled "ARRANGEMENTS AND METHODS FOR CONNECTING DECORATIVE ORNAMENTS" filed on Feb. 5, 2004 and having Ser. No. 10/774,264.

This application is incorporated by reference herein in its entirety.

FIELD OF THE INVENTION

This invention relates, generally, to braces, arrangements, and methods for supporting arms of ornamental fixtures, for example, lamps and chandeliers, more particularly, to braces, arrangements, and methods for supporting glass arms of decorative fixtures.

BACKGROUND OF THE INVENTION

The design of ornamental fixtures, such as chandeliers, is typically hampered by the disadvantages of using glass as the material of construction. In contrast to other materials of construction, glass is typically more brittle and more prone to fracture due to its lower tensile strength. Typically, in the conventional art, the lower strength of glass limits the size of glass components and the loading of chandeliers, for example, limits the size and number of ornaments that can be attached to glass components of chandeliers.

This is particularly the case in the design of glass arm chandeliers. Glass arm chandeliers typically have one or more solid glass or glass tubing arms upon which chandelier components, such as crystal ornaments or light fixtures, are mounted. The fragility of such glass arms typically limits the size, for example, the length, and the carrying capacity of such arms. Also, typically, the size and number of ornaments that can be hung from such glass arms are limited. As a result, the limitations of the carrying capacity of glass arms limits or compromises the freedom designers have in designing glass arm chandeliers.

The limitations of conventional glass arm chandelier design are particularly acute as the size of the chandelier increases. Ever increasing customer demands for larger and more elaborate chandeliers further underscore the limitations of conventional glass arm design. For example, the capability of present arm designs to withstand the loading of fixtures and ornaments is typically exceeded as the size of a chandelier exceeds 10 feet in diameter. Such large diameter chandeliers, and the ever-increasing size and number of ornaments mounted on such chandeliers, taxes the capacity of conventional glass arm design by providing ever-larger loads on the glass arms.

The present invention overcomes these and other limitations of prior art ornamental fixture design, for example, the limitations of large chandelier design.

BRIEF SUMMARY OF ASPECTS OF THE INVENTION

One aspect of the invention is a brace for supporting an arm of an ornamental fixture, the brace including an elongated element having a first end adapted to mount to a support and a free second end; and at least one platform located between the first end and the second end, the platform adapted to support the arm of the fixture. In one aspect of the invention, the arm of the ornamental fixture has a curved lower surface and the brace has an upper surface that substantially conforms to the curved lower surface of the arm.

Another aspect of the invention is an arrangement for supporting a decorative fixture, the arrangement including a glass arm having a first end adapted to mount to a support and a second free end adapted for mounting the decorative fixture; and a brace for supporting the glass arm, the brace including an elongated element having a first end adapted to mount to the support and a free second end; and at least one platform located between the first end and the second end of the elongated element, the platform adapted to support the glass arm. In one aspect of the invention, the glass arm has a lower surface and the elongated element has an upper surface shaped to substantially conform to the lower surface of the glass arm.

Another aspect of the invention is a method of supporting an arm of an ornamental fixture, the method including providing a brace having an elongated element having a first end adapted to mount to a support and a free second end and at least one platform located between the first end and the second end, the platform adapted to support the arm of the fixture; mounting the first end of the brace to a support; and mounting the arm of the ornamental fixture to the support and to the brace wherein the arm is supported by the at least one platform.

Thus, aspects of the present invention provide for improved braces, mounting arrangements, and methods for mounting arms for ornamental fixtures, for example, for supporting glass arms for ornamental lighting fixtures. In addition, aspects of the present invention provide improved means of mounting ornaments, for example, means of mounting ornaments to glass arm assemblies where the load of the ornaments is not imposed upon the glass arm.

BRIEF DESCRIPTION OF FIGURES

The subject matter that is regarded as the invention is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF ASPECTS OF THE INVENTION

The details and scope of the aspects of the present invention can best be understood upon review of the attached figures and their following descriptions.

Figure 1:
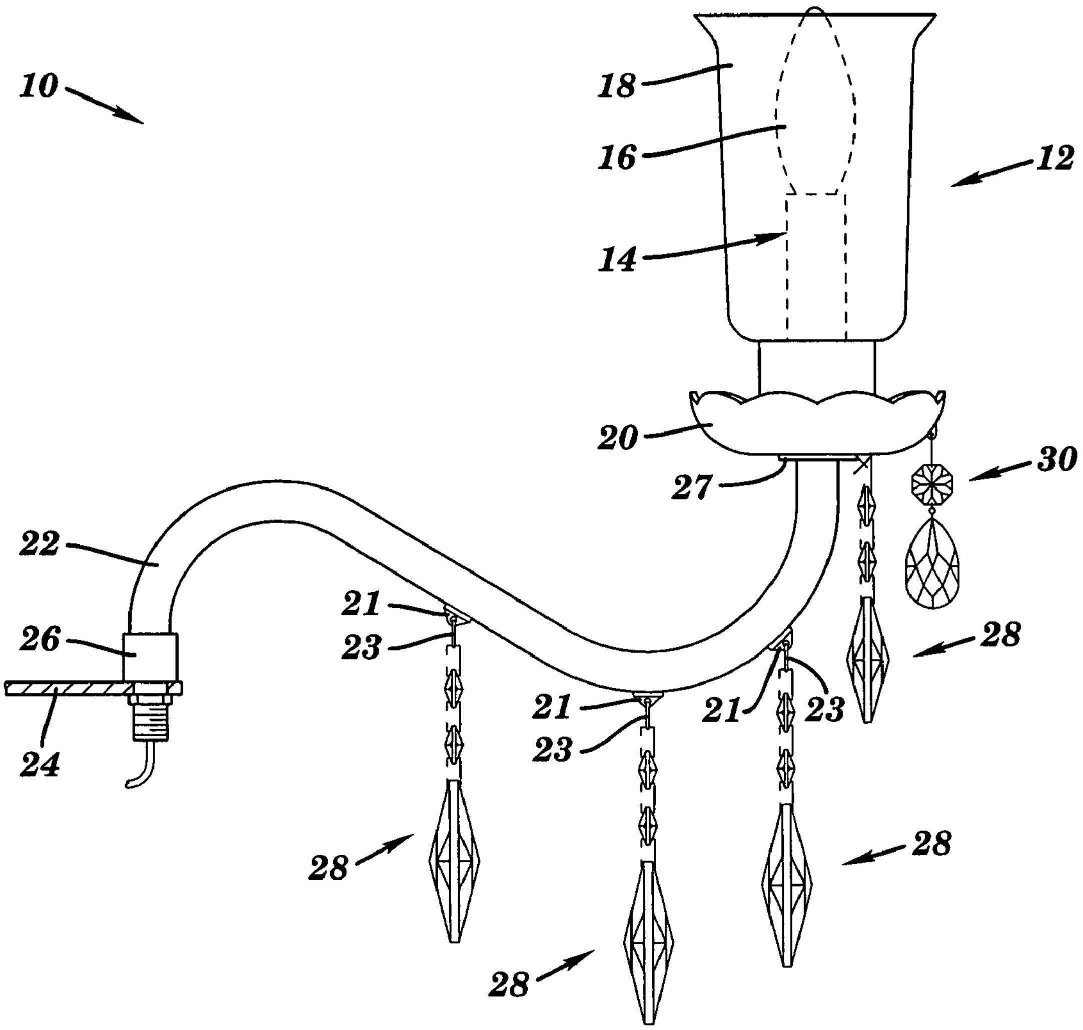
FIG. 1 PRIOR ART
FIG. 1 is a side elevation view of a prior art fixture mounting over which aspects of the present invention are improvements.

FIG. 1 is a side elevation view of prior art fixture mounting 10 over which the present invention is an improvement. Fixture mounting 10 supports a fixture 12. In the prior art mounting shown in FIG. 1, fixture 12 includes a light fixture 14 having a bulb 16 which is enclosed within a glass shade 18, in this case, a hurricane glass shade. In this prior art arrangement, fixture 12 also includes a decorative crystal bobeche 20. Fixture 12 is supported on a glass arm 22, in this case, a curved glass arm, which is mounted to a mounting plate 24 by conventional means. As is typical in the art, arm 22 may have ferrules 26, 27 mounted at either end of arm 22 to function as interfacing structures between arm 22 and support plate 24 and arm 22 and fixture 12, respectively. As is also typical in the art, numerous decorative ornaments may be mounted to bobeche 20 and arm 22. For example, decorative pendant and crystal arrangements 28 and 30 may be mounted to arm 22 and bobeche 20. As is typical of the prior art, arrangements 28 are mounted to arm 22 by means of a mounting buttons 21 and rings 23. Mounting buttons 21 are typically mounted with an adhesive and rings 23 provide a mounting interface between mounting buttons 21 and mounting arrangement 28.

According to the conventional art, arm 22 is typically made from glass due to glass's desirable aesthetic appearance. However, glass is a brittle material having limited tensile strength. This limited strength of glass limits the design alternative, length, and loading of arm 22.

However, advancements in the field of fixture design, for example, advancements in the field of chandelier design, impose every increasing demands to increase the length of arm 22 and increase the size and number of fixtures, for example, larger light fixtures 12, and increase the size and number of decorative pendants and crystal arrangements, for example, arrangements 28 and 30. The aspect of the present invention shown in FIG. 2 addresses these and other limitations of the prior art.

Figure 2:
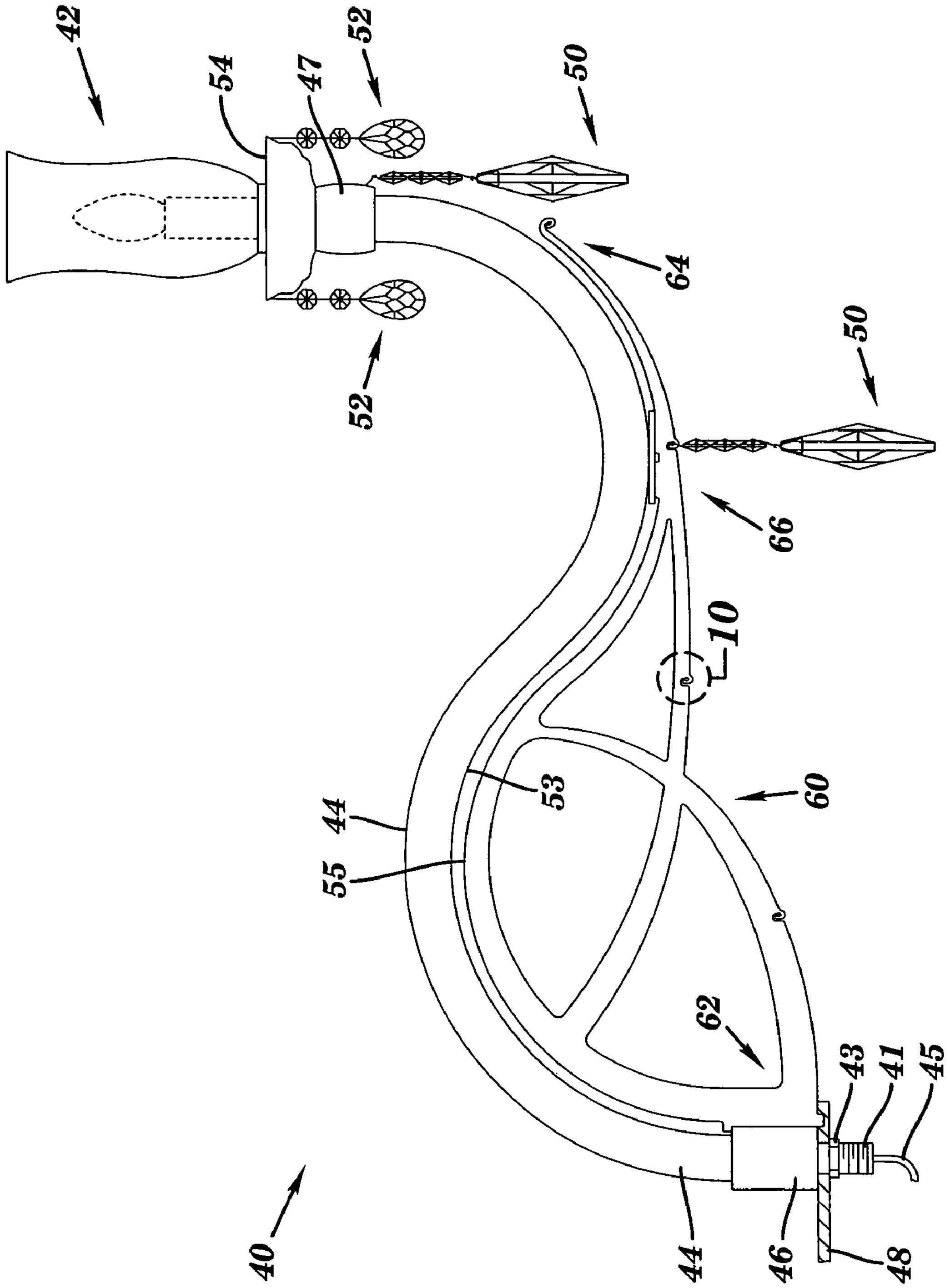
FIG. 2 is a side elevation view similar to FIG. 1 illustrating one aspect of the present invention supporting a glass arm of a fixture.

FIG. 2 is a side elevation view of a fixture mounting 40 according to one aspect of the present invention. Fixture mounting 40 includes a fixture 42 and an arm 44, similar to fixture 12 and arm 22, respectively, shown in FIG. 1. Similar to arm 22, arm 44 includes a first ferrule 46, similar to ferrule 26 in FIG. 1, by which arm 44 is mounted to a mounting plate 48. A partial cross-sectional view of mounting plate 48 is shown in FIG. 2. As is typical of the prior art, ferrule 46 may include a threaded extension 41 mounted to plate 48 by means of nut 43. As is also typical, electrical power may be provided to fixture 42 by means of a cord 45 which passes through arm 44. Arm 44 also includes a second ferrule 47, similar to ferrule 27 in FIG. 1, by which fixture 42 is mounted to arm 44. Arrangement 40 also includes numerous decorative pendant and crystal arrangements 50 and 52 similar to arrangements 28 and 30 shown in FIG. 1, and a bobeche 54 which may be similar to bobeche 20 shown in FIG. 1.

However, according to this aspect of the invention, fixture mounting 40 also includes an arm brace 60 that is adapted to arm 44. For example, in one aspect of the invention, brace 60 is adapted to arm 44 when the loading on arm 44 creates a stress in arm 44 that would exceed the strength of the glass material from which arm 44 is made. Arm brace 60 includes a first end 62 mounted to mounting plate 48 and a second free end 64; that is, second end 64 is typically unsupported, whereby arm brace 60 is cantilevered to mounting plate 48. In one aspect of the invention, first end 62 may be mounted to ferrule 46, for example, welded to ferrule 46, and first end 62 may be mounted to mounting plate 48 by means of ferrule 46. Arm brace 60 also includes at least one platform 66 positioned between first end 62 and second end 64. Platform 66 is adapted to provide at least one surface upon which arm 44 may rest whereby arm brace 60 supports at least some of the load on arm 44. In one aspect of the invention, platform 66 may provide a resilient or cushioning material between platform 66 and arm 44, for example, a felt or felt-like material. According to this aspect of the invention, by supporting at least some of the load on arm 44, arm brace 60 reduces the bending stress in arm 44 whereby arm 44 may be longer; may be loaded with heavier or more numerous fixtures 42 or heavier and more numerous crystal arrangements 50 and 52; may provide more flexibility to the designer of arrangement 40; or a combination of these advantages. In addition, as will be discussed below with respect to FIG. 10, arm brace 60 may also include structures adapted to mount one or more ornaments or ornament arrangements that, among other things, may reduce the labor required to mount such items. A detailed view of arm brace 60 appears in FIG. 3.

Figure 3:
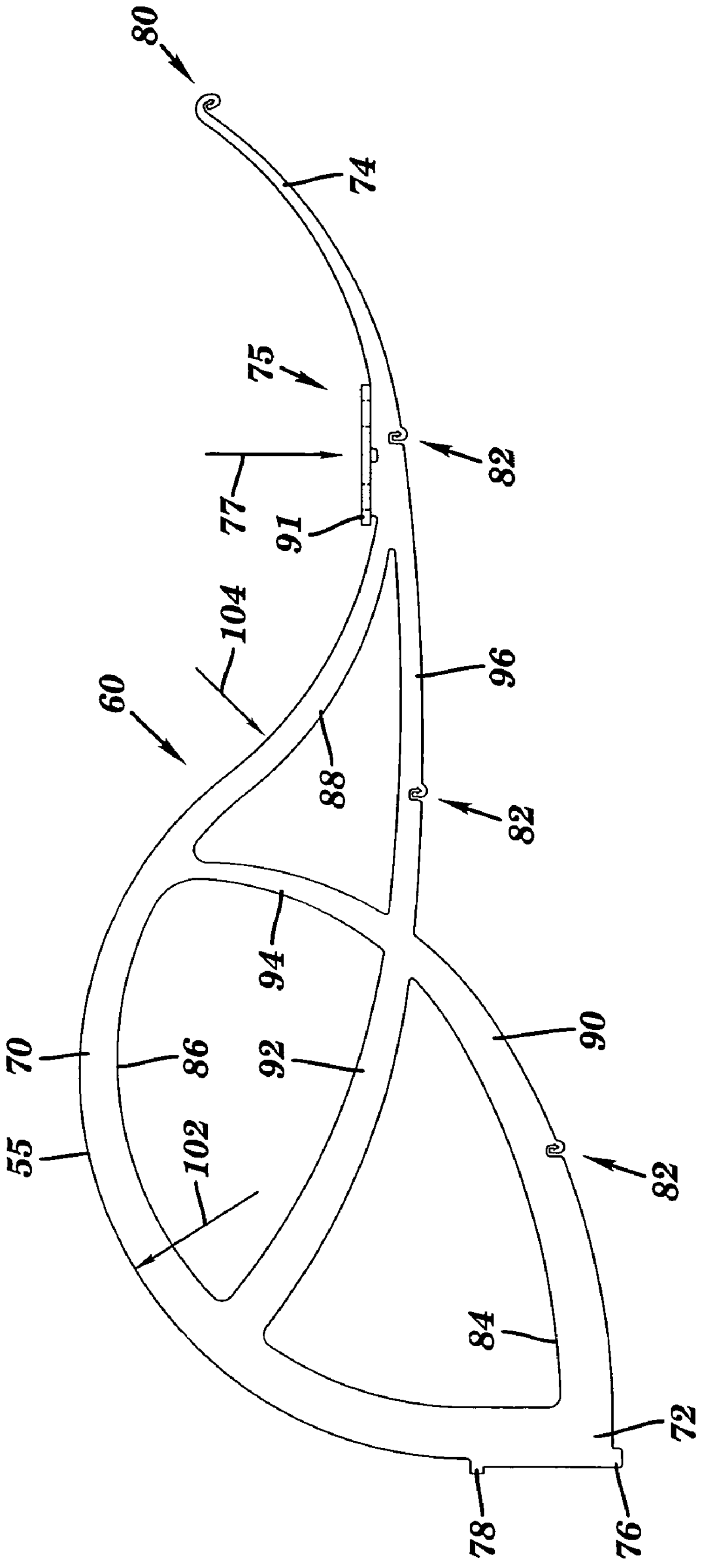
FIG. 3 is a side elevation view of an arm brace shown in FIG. 2 according to one aspect of the present invention.
Figure 4:
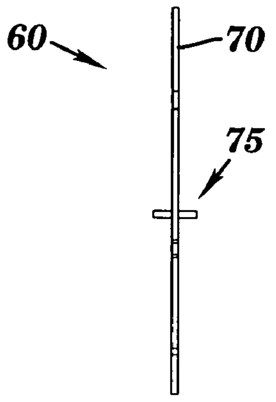
FIG. 4 is a right side elevation view of the aspect of the invention shown in FIG. 3.
Figure 5:
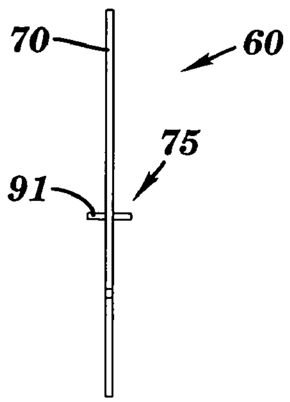
FIG. 5 is a left side elevation view of the aspect of the invention shown in FIG. 3.
Figure 6:
FIG. 6 is a top view of the aspect of the invention shown in FIG. 3.
Figure 7:
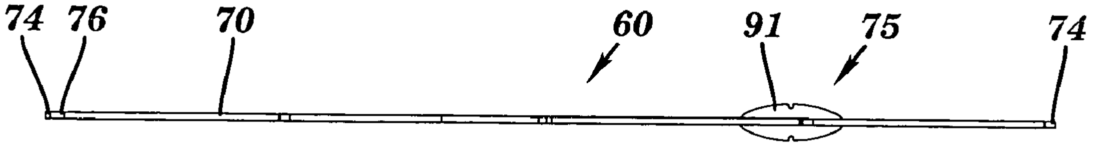
FIG. 7 is a bottom view of the aspect of the invention shown in FIG. 3.

FIG. 3 is a side elevation view of an arm brace 60 according to one aspect of the present invention. FIG. 4 is a right side elevation view of arm brace 60 shown in FIG. 3. FIG. 5 is a left side elevation view of arm brace 60 shown in FIG. 3. FIG. 6 is a top view of arm brace 60 shown in FIG. 3. FIG. 7 is a bottom view of arm brace 60 shown in FIG. 3.

In this aspect of the invention, arm brace 60 includes an elongated element 70 having a first end 72 and a second end 74 and a platform 75. First end 72 is typically adapted for mounting to a support, for example, to mounting plate 48 shown in FIG. 2. Though many means of mounting first end 72 to a support may be provided, in the aspect of the invention shown in FIG. 3, first end 72 includes a first projection or lug 76 which may engage a keyway or notch in mounting plate 48 (See keyway 51 in FIG. 9), and first end 72 also includes a second projection or lug 78 which may engage a ferrule, for example, ferrule 46 shown in FIG. 2.

Second end 74 of arm brace 60 may include one or more decorative designs, for example, a curl 80, or one or more bead or crystal pendant mountings (for example, one or more ornament mounting hook arrangements 82 discussed below). In one aspect of the invention, second end 74 may have little or no function; that is, second end 74 beyond platform 75 may provide little or no support to an arm supported by platform 75, and thus may comprise any desirable shape or configuration. For example, in one aspect of the invention, second end 74 may comprise platform 75 and no further material beyond platform 75 may be provided. In another aspect of the invention, second end 74 may comprise a decorative design, for example, a decorative geometric or floral design, among other designs. In one aspect of the invention, second end 74 may include one or more means of mounting an ornament or ornament arrangements, for example, one or more ornament mounting hook arrangements 82, discussed below, as desired to enhance the aesthetic appearance of the fixture.

According to this aspect of the invention, arm brace 60 includes at least one platform 75. Platform 75 provides a location upon which an arm, for example, arm 44 shown in FIG. 2, may rest whereby at least some of the load, as represented by arrow 77, upon the arm 44 is transferred to arm brace 60. Though in the accompanying figures platform 75 is depicted as a plate, this depiction is simply provided to facilitate the discussion of aspects of the invention. One of skill in the art will understand that platform 75 may take the form of many types of structures and still provide the desired function, that is, providing a location where arm brace 60 may contact and support the fixture arm being supported. Though in one aspect of the invention, platform 75 may be provided by a plate (for example, plate 91 described below), in other aspects of the invention, platform 75 may comprise simply a surface on arm brace 60 where a corresponding arm may rest, such as arm 44 shown in FIG. 2. This surface may be raised, for example, raised above the general upper surface of elongated element 70, depressed, level, inclined, curved, rounded, concave, convex, or otherwise adapted to accept contact and transfer of load from an arm to arm brace 60.

Figure 8A:
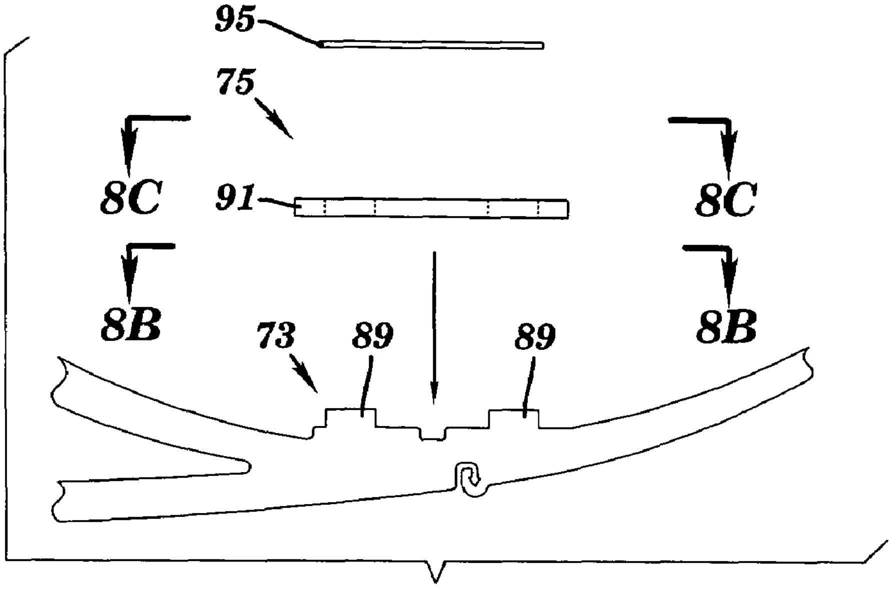
FIG. 8A is a detailed, exploded elevation view of the platform mounting shown in FIG. 3.
Figure 8B:
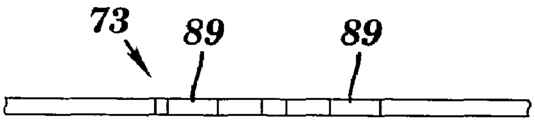
FIG. 8B is a top view of the platform mounting shown in FIG. 8A as viewed along lines 8B-8B in FIG. 8A.
Figure 8C:
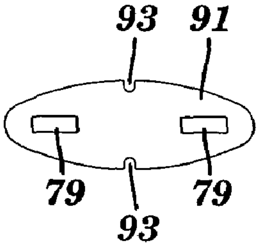
FIG. 8C is a plan view of the mounting plate shown in FIG. 8A as viewed along lines 8C-8C.

In the aspect of the invention shown in FIG. 3, platform 75 comprises a plate 91, for example, an oval or ellipsoidal plate mounted to brace 60. FIG. 8A is a detailed, exploded elevation view of the platform 75 shown in FIG. 3 having plate 91 and platform mounting 73 on brace 60. FIG. 8B is a top view of the platform mounting 73 as viewed along lines 8B-8B in FIG. 8A. FIG. 8C is a plan view of the mounting plate 91 shown in FIG. 8A as viewed along lines 8C-8C. A cushioning pad 95 may be placed on plate 91 to minimize or prevent direct contact between the arm (not shown) and mounting plate 91. In one aspect of the invention, pad 95 may be a felt pad, for example, a 0.125 inch-thick white felt pad, having an adhesive backing to facilitate assembly. As shown in FIGS. 8A and 8B, platform mounting 73 comprises at least one, preferably two, raised notches 89 located on the upper surface of brace 60. According to this aspect of the invention, plate 91 includes at least one, preferably at least two, perforations 79 corresponding to notches 89. Perforations 79 and notches 89 may have any corresponding shape, for example, circular, square, or rectangular, among others. According to one aspect of the invention, plate 91 is mounted to notches 89 by welding, brazing, or the use of an adhesive. In one aspect of the invention, plate 91 is made from the same material as brace 60. As shown in FIG. 8C, mounting plate 91 may include at least two notches 93 positioned in opposite edges of plate 91. According to one aspect of the invention, notches 93 are provided for attaching a wire or band to these notches 93 to assist in retaining the arm supported by brace 60 on plate 93. For example, in one aspect of the invention, a safety wire, for example, a nickel-chrome wire, may be wrapped about arm 44 and engage notches 93 to retain brace 60 and arm 44.

According to one aspect of the invention, the size and shape of plate 91 may vary depending upon the size and shape of the fixture arm being supported by brace 60. In one aspect of the invention, the dimensions, for example, length and width, of plate 91 may vary from about 0.125 inches to about 6 inches, or even larger. The shape of plate 91 may be circular, square, or rectangular, among other geometric shapes. In the aspect of the invention shown in FIG. 8C, plate 91 is an ellipsoidal plate having a major axis of about 2.75 inches and a minor axis of about 1.0 inch.

Figure 9:
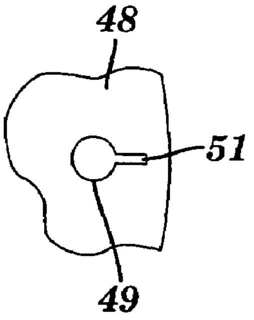
FIG. 9 is a partial plan view of the mounting plate shown in FIG. 2.

FIG. 9 is a partial plan view of the mounting plate 48 shown in FIG. 2. Mounting plate 48 includes a hole 49 through which the threaded extension 41 of ferrule 46 of mounting arm 44 may be inserted and retained on mounting plate 48 by means of nut 43. Mounting plate 48 may also include at least one notch or keyway 51 into which lug 76 of brace 60 may be inserted to mount brace 60 on mounting plate 48.

In one aspect of the invention, arm brace 60 may also be adapted to accept one or more ornaments, for example, crystal or bead pendants, or one or more fixtures, for example, one or more additional fixtures, such as one or more fixtures 42 shown in FIG. 2. In one aspect of the invention, as shown in FIG. 3, arm brace 60 may include one or more hooks or ornament mounting hook arrangements 82, for example, cutouts for mounting one or more bead or crystal pendants, for instance, one or more crystal arrangements 50 and 52 shown in FIG. 2. The details of one ornament mounting hook arrangement, or "crystal-carrying cut-out," 82 according to one aspect of the invention are illustrated in FIG. 10 and are described below.

Figure 10:
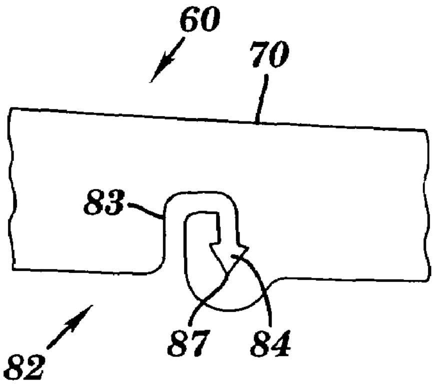
FIG. 10 is detailed view of the ornament mounting hook arrangement shown in FIG. 3.

FIG. 10 is detailed view of the ornament mounting hook arrangement, or "crystal-carrying cut-out," 82 shown in FIG. 3. According to one aspect of the present invention, one or more ornament mounting hook arrangements 82 may be provided on brace 60, for example, along the lower edge of brace 60. In one aspect of the invention, as shown in FIG. 3, the second end 64 of brace 60 may include one or more ornament mounting hook arrangements 82. According to this aspect of the invention, ornament mounting hook arrangement 82 comprises an inverted, U-shaped passageway or channel 83 having a closed end 84 adapted to receive and retain a mounting hook or loop, for example, for mounting ornament arrangements, such as ornament arrangements 50 or 52 shown in FIG. 2. In one aspect of the invention, as shown in FIG. 10, the closed end 84 of ornament mounting hook arrangement 82 may comprise a point 87 wherein closed end 84 takes the appearance of an arrow head. According to this aspect of the invention, the side extensions of the arrowhead of closed end 84 provide obstructions to the disengagement of hooks or loops from ornament mounting hook arrangement 82. In another aspect o the invention, the width of channel 83, for example, the thickness of elongated element 70, provides an obstruction to the twisting of a hook or loop, for example, the twisting of a "Y hook" (described in the above-referenced copending application), mounted in ornament mounting hook arrangement 82. Further aspects and advantages of ornament mounting hook arrangement 82 are provided in copending application Ser. No. 10/774,264 referenced above.

According to one aspect of the invention, brace 60 may include one or more ornament mounting hook arrangements 82 located anywhere the attachment of one or more ornaments or ornament arrangements is desired. In one aspect of the invention, ornament mounting hook arrangements 82 facilitates the assembly of fixtures by reducing the labor required and may reduce the number of parts required for a fixture. For example, in one aspect of the invention, ornament mounting hook arrangements 82 may be introduced to brace 60 by simply fabricating brace 60 with arrangements 82 as desired, for example, by laser cutting, plasma cutting, water-jet cutting, or any other type of fabrication method. This aspect of the invention contrasts with conventional methods of attaching ornaments to arms, for example, as illustrated in FIG. 1. In the prior art method shown in FIG. 1, several ornament arrangements 28 are mounted to glass arm 22 by means of mounting buttons 21 and rings 23. In order to mount arrangements 28 to arm 22, buttons 21 must be provided, positioned, and attached to arm 22 (for example, using an adhesive) and then rings 23 must be mounted in buttons 21 in order to then mount arrangement 28. This relatively tedious and time consuming assembly method, as well as the additional hardware required, is obviated by ornament mounting hook arrangements 82 of the present invention. The mounting of ornaments using ornament mounting hook arrangements 82 does not require an additional assembly method and additional hardware, and may allow for the elimination of some hardware, for example, elimination of buttons 21 and rings 23.

In the aspect of the invention shown in FIG. 3, elongated element 70 of arm brace 60 may comprise any element that is adapted to transfer a load placed on platform 75 to a support (such as supporting plate 48 in FIG. 2) to which first end 72 is mounted. In one aspect of the invention, brace 60 may be adapted to have a shape that substantially conforms to the aesthetic line of the arm, such as arm 44, while providing the necessary load bearing characteristics. For example, in one aspect of the invention, arm 44 may have a lower surface or edge 53 (See FIG. 2.) having a desired decorative shape and brace 60 may have an upper surface or edge 55 that substantially conforms in shape to the lower surface or edge 53 of the arm 44. For example, in the aspect of the invention shown in FIG. 3, elongated element 70 comprises a perforated sinuous structure adapted to substantially conform to a sinuous arm 44 shown in FIG. 2. In this aspect of the invention, elongated element 70 is shaped to mimic the shape of arm 44. However, according to aspects of the present invention, the shape of elongated element 70 may vary broadly, for example, depending upon the shape of the arm supported by elongated element 70. For example, according to one aspect of the invention, elongated element 70 may assume one of the profiles shown in FIGS. 11A through 11F.

Figure 11A:
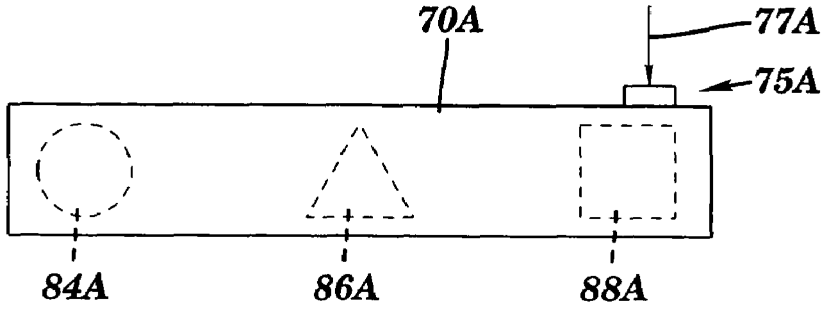
FIGS. 11A through 11F are side elevation views of other aspects of the present invention.
Figure 11B:
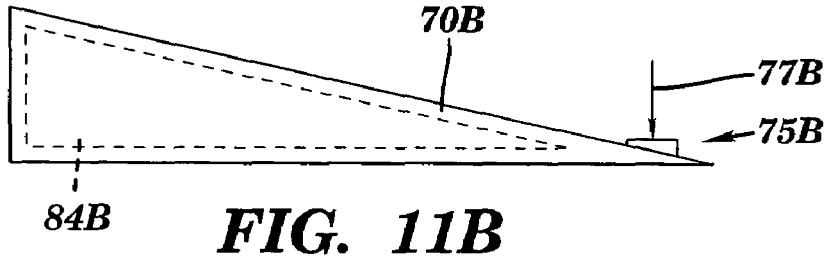
Figure 11C:
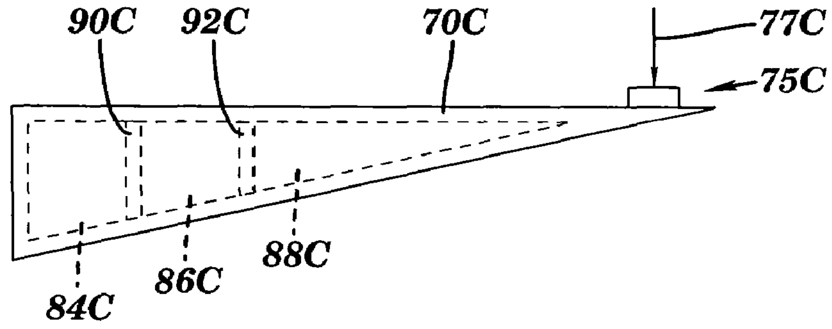
Figure 11D:
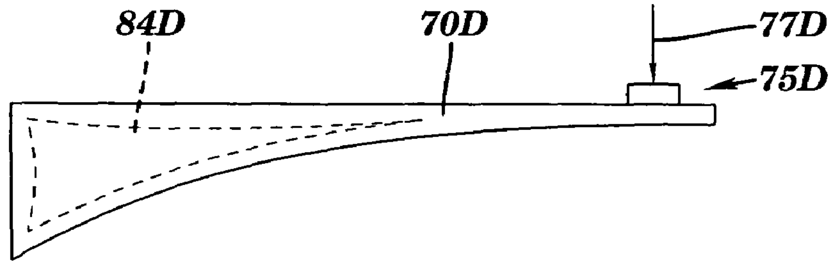
Figure 11E:
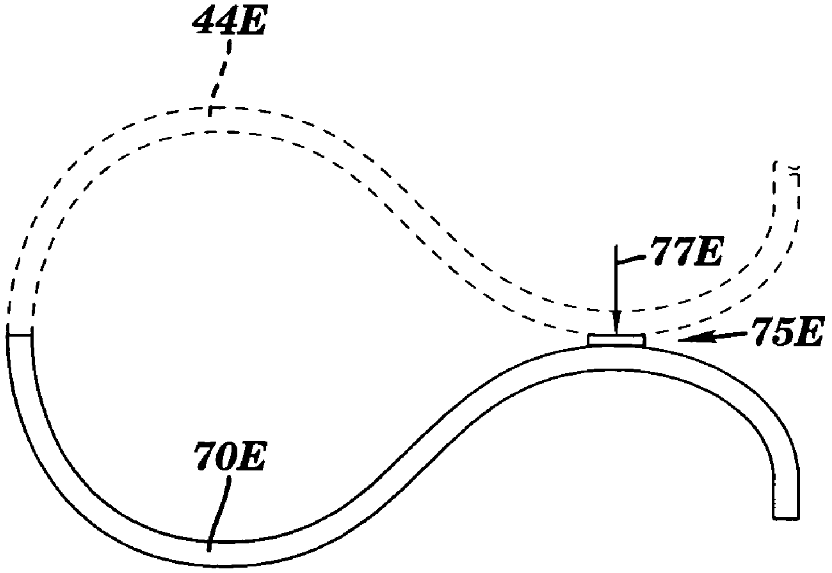
Figure 11F:
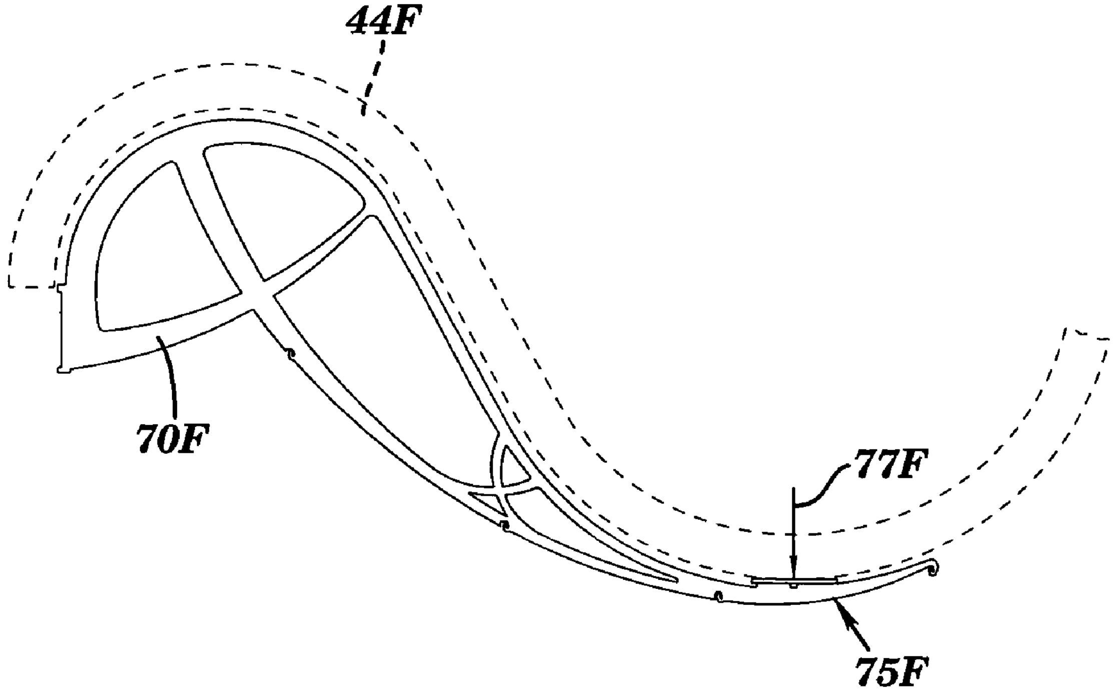

FIG. 11A illustrates one aspect of the invention having an elongated element 70A. Element 70A has a rectangular shape and at least one platform 75A for supporting an arm as indicated by arrow 77A. FIG. 11B illustrates one aspect of the invention having an elongated element 70B having a triangular shape and having at least one platform 75B for supporting an arm as indicated by arrow 77B. FIG. 11C illustrates one aspect of the invention having an elongated element 70C having a triangular shape and having at least one platform 75C supporting an arm as indicated by arrow 77C. FIG. 11D illustrates one aspect of the invention having an elongated element 70D having a curvilinear triangular shape and having at least one platform 75D supporting an arm as indicated by arrow 77D. FIG. 11E illustrates one aspect of the invention having an elongated element 70E having a sinuous shape reflecting a mirror image of a arm 44E (shown in phantom in FIG. 11E) similar in shape to arm 44 shown in FIG. 2 and having at least one platform 75E supporting a arm as indicated by arrow 77E. FIG. 11F illustrates one aspect of the invention having an elongated element 70F having a sinuously shape similar to elongated element 70 shown in FIG. 3 and adapted to have a shape that conforms to the aesthetic line of a arm 44F (shown in phantom) and having at least one platform 75F supporting a arm 44F as indicated by arrow 77F.

According to one aspect of the invention, elongated element 70 shown in FIG. 3 includes a plurality of perforations 84, 86, and 88 defined by cross members 90, 92, 94, and 96. According to one aspect of the invention, perforations (such as perforations 84, 86, and 88) and cross members (such as cross members 90, 92, 94, and 96) may be provided in elongated element 70 to enhance the aesthetic appeal of arm brace 60. However, in one aspect of the invention many different types and configurations of perforations and cross members may be provided in arm brace 60 to, among other things, enhance the aesthetic appeal, minimize material usage, and enhance the structural integrity of arm brace 60.

FIG. 11A through 11E Illustrate various perforations and cross member styles and configurations (in phantom) that may be used in aspects of the present invention. For example, as shown in FIG. 11A, perforations 84A, 86A, and 88A of elongated element 70A may be circular, rectangular, rectangular, or combinations thereof. As shown in FIG. 11B, perforation 84B of elongated element 70B may mimic the shape of element 70B, for example, an elongated triangle. As shown in FIG. 11C, perforations 84C, 86C, and 88C and transverse cross beams 90C and 92C may be provided in elongated element 70C. As shown in FIG. 11D, perforation 84D of elongated element 70D may include curvilinear sides to enhance the appearance of the elongated element 70D. Those of skill in the art will recognize other configurations of perforations and cross beams that may be used in aspects of the present invention.

The thickness of brace 60 may vary from about 0.01 inches to about 3.0 inches depending upon the length of brace 60 and the load placed upon brace 60. In one aspect of the invention, brace 60 has a thickness of between about 0.10 inches to about 0.5 inches, and may typically be between about 0.125 inches and about 0.25 inches. For example, in one aspect of the invention brace 60 (and platform plate 91) may be made from 7 gauge steel plate having a nominal thickness of about 0.1793 inches.

The length and height of brace 60 may also vary broadly depending upon the size of the fixture brace 60 is being used to support and the loading on brace 60. For example, in one aspect of the invention, the arm being supported may be at least about 70 cm in length. In another aspect of the invention, the arm being supported may be at least about 2 meters in length or at least about 3 meters in length. In one aspect of the invention, brace 60 may have a length of between about 6 inches and about 20 feet, but typically has a length between about 2 feet and about 5 feet. For example, in one aspect of the invention brace 60 may have a length of about 27 inches. Similarly, in one aspect of the invention, brace 60 may have a height of between about 3 inches and about 4 feet, but typically has a height of between about 6 inches and about 2 feet. For example, in one aspect of the invention, brace 60 may have a height of about 10.5 inches. Also, the radii of the contours of the edges of brace 60 may vary depending upon the geometry of the arm brace 60 is used to support. For example, the radii 102, 104 (see FIG. 3) of the upper edges of brace 60 may be between about 3 inches and about 4 feet, but typically, these radii may be between about 6 inches and about 2 feet. For example, in one aspect of the invention, radius 102 may be about 7.5 inches and radius 104 may be about 8 inches.

Brace 60 may be made from any type of structural material, for example, a metallic or a non-metallic material. In one aspect of the invention, brace 60 may be made from a metallic material, for example, iron, steel, stainless steel, aluminum, titanium, nickel, magnesium, copper, silver, gold, or any other metal from which fixture or chandelier components may be made. In one aspect of the invention, brace 60 may be made from carbon steel, for example, AISI 1015 Hot Rolled carbon steel, or its equivalent, for instance, AISI 1015 Hot rolled steel that has been pickled and oiled (that is, "P&O"). In one aspect of the invention, brace 60 may be "mirrored," that is, a reflective mirror-like coating may be applied to one or both sides of brace 60 to enhance the aesthetical quality of brace 60 and the fixture into which brace 60 is mounted. According to one aspect of the invention, platform plate 91 may be made from one of the metals mentioned above with respect to brace 60; plate 91 may also be mirrored.

In one aspect of the invention, brace 60 may also be non-metallic, for example, made from a glass or a plastic, such as polyethylene (PE), polypropylene (PP), polyester (PE), polytetraflouroethylene (PTFE), acrylonitrile butadiene styrene (ABS) or their equivalents. One of these non-metallic materials may also be mirrored as described above. In addition, in one aspect of the invention, brace 60 may be made from a material that is opaque, translucent, or transparent.

Brace 60 may be fabricated by any conventional fabrication process, for example, by laser cutting, water-jet cutting, plasma cutting, electro-discharge machining (EDM), for example, wire-EDM, among other conventional fabrication methods. In one aspect of the invention, brace 60 and may fabricated with the aid of computer control.

As will be appreciated by those skilled in the art, features, characteristics, and/or advantages of the arm brace described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims and their equivalents.

We claim:

1. An arrangement for supporting a decorative fixture, the arrangement comprising:

a glass arm having a first end adapted to mount to a support and a second free end adapted for mounting the decorative fixture;

a brace for supporting the glass arm, the brace comprising:

an elongated element having a first end adapted to mount to the support and a free second end; and at least one platform located between the first end and the second end of the elongated element, the platform adapted to support the glass arm; and a cushioning material located on the platform.

2. The arrangement recited in claim 1, wherein the glass arm comprises a lower surface and the elongated element comprises an upper surface shaped to substantially conform to the lower surface of the glass arm.

3. The arrangement recited in claim 2, wherein the lower surface of the glass arm comprises a sinuous lower surface and wherein the upper surface of the elongated element substantially conforms to the sinuous lower surface of the glass arm.

4. The arrangement recited in claim 1, further comprising at least one means for mounting an ornament to the brace.

5. The arrangement recited in claim 4, wherein the at least one means for mounting an ornament to the brace comprises a u-shaped channel in the elongated element.

6. The arrangement recited in claim 1, wherein the glass arm comprises a length, and wherein the platform is located at least half the length from the first end of the glass arm.

7. The arrangement recited in claim 1, wherein the glass arm comprises a length, and wherein the glass arm is supported by the at least one platform at a location at least half the length from the first end of the glass arm.

8. The arrangement as recited in claim 1, wherein the platform comprises a plate mounted to the elongated element.

9. The arrangement recited in claim 8 wherein the plate comprises a perforated plate adapted to mount on one or more projections on the elongated element.

10. The arrangement as recited in claim 1, wherein the elongated element comprises at least one perforation.

11. The arrangement as recited in claim 1, wherein the elongated element comprises a thickness between about 0.10 inches and about 3.0 inches.

12. The arrangement as recited in claim 1, wherein the platform comprises a surface on the elongated element.

13. The arrangement as recited in claim 1, wherein the elongated element comprises a curvilinear upper surface that substantially conforms to a lower surface of the glass arm.

14. A method of supporting an arm of an ornamental fixture, the method comprising:

providing a brace comprising an elongated element having a first end adapted to mount to a support and a free second end, and at least one platform located between the first end and the second end, the platform adapted to support the arm of the fixture:

mounting the first end of the brace to the support;

mounting the arm of the ornamental fixture to the support and to the brace wherein the arm is supported by the at least one platform; and positioning a cushioning material between the arm and the platform of the brace.

15. The method as recited in claim 14, wherein the arm of the ornamental fixture comprises a sinuous lower surface and the brace comprises a sinuous upper surface, wherein mounting the arm of the ornamental fixture further comprises substantially mating the lower surface of the arm with the upper surface of the brace.

* * * * *

UNITED STATES PATENT AND TRADEMARK OFFICE

CERTIFICATE OF CORRECTION

PATENT NO. : 7,243,886 B2
APPLICATION NO. : 10/773551
DATED : July 17, 2007
INVENTOR(S) : Bayer et al.

It is certified that error appears in the above-identified patent and that said Letters Patent is hereby corrected as shown below:

Title page, item [75] Under Inventors:

The first's inventor's name should read -- Georg Bayer, Plattsburgh, NY (US) --

Signed and Sealed this

Eighteenth Day of September, 2007

JON W. DUDAS
*Director of the United States Patent and Trademark Office*